United States Patent
Shimada et al.

(10) Patent No.: US 9,235,439 B2
(45) Date of Patent: Jan. 12, 2016

(54) MANAGEMENT SERVER, PATCH SCHEDULING METHOD, AND RECORDING MEDIUM

(71) Applicant: FUJITSU LIMITED, Kawasaki-shi, Kanagawa (JP)

(72) Inventors: Kuniaki Shimada, Kawasaki (JP); Atsuji Sekiguchi, Kawasaki (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/478,226

(22) Filed: Sep. 5, 2014

(65) Prior Publication Data

US 2014/0380314 A1   Dec. 25, 2014

Related U.S. Application Data

(63) Continuation of application No. PCT/JP2012/057072, filed on Mar. 19, 2012.

(51) Int. Cl.
*G06F 9/455* (2006.01)
*G06F 9/48* (2006.01)
*G06F 11/34* (2006.01)

(52) U.S. Cl.
CPC .......... *G06F 9/4856* (2013.01); *G06F 9/45558* (2013.01); *G06F 11/3433* (2013.01); *G06F 2009/4557* (2013.01); *G06F 2201/815* (2013.01)

(58) Field of Classification Search
CPC .................................................. G06F 9/45533
USPC ............................................................ 718/1
See application file for complete search history.

(56) References Cited

U.S. PATENT DOCUMENTS 8,286,165 B2   10/2012   Miyata et al.
8,327,438 B2 *  12/2012   Hwang ................... G06F 21/53
                                                  713/187

(Continued)

FOREIGN PATENT DOCUMENTS

JP     11-120189     4/1999
JP     2005-327279   11/2005

(Continued)

OTHER PUBLICATIONS

PFU Technical Review, Nov. 1, 2011, vol. 22, No. 2, whole No. 42, p. 1 to 5.

(Continued)

*Primary Examiner* — Andy Ho
(74) *Attorney, Agent, or Firm* — Staas & Halsey LLP

(57) ABSTRACT

A non-transitory computer-readable recording medium has stored therein a patch scheduling program that causes a computer to execute a process. The process includes managing, aggregating, determining, and scheduling. The managing includes managing a system including a plurality of software that control a plurality of virtual machines. The aggregating includes aggregating virtual machines including a similar trend regarding a predetermined index thereof with a mutually-same virtual software. The determining includes determining a time period during which the virtual machines are to be moved, based on the trends of the virtual machines aggregated with the mutually-same virtual software and based on moving time of the move of the virtual machines to a different virtual software included in the plurality of virtual software. The scheduling includes scheduling applying a patch to each of the plurality of virtual software at the determined time periods.

10 Claims, 16 Drawing Sheets

(56) References Cited

U.S. PATENT DOCUMENTS

| | | |
|---|---|---|
| 2005/0268298 A1 | 12/2005 | Hunt et al. |
| 2007/0169121 A1 | 7/2007 | Hunt et al. |
| 2011/0161491 A1 | 6/2011 | Sekiguchi |
| 2012/0185856 A1* | 7/2012 | Ashihara ............... G06F 9/4856 718/1 |

FOREIGN PATENT DOCUMENTS

| | | |
|---|---|---|
| JP | 2008-217302 | 9/2008 |
| JP | 2010-117760 | 5/2010 |
| JP | 2011-090594 | 5/2011 |
| JP | 2011-138184 | 7/2011 |

OTHER PUBLICATIONS

International Search Report mailed May 22, 2012 in corresponding International Application PCT/JP2012/057072.

* cited by examiner

FIG.2

| VM NAME (11a) | DATE (11b) | NIGHTTIME (11c) | DAYTIME (11d) |
|---|---|---|---|
| VM1 | 9/1 | 1232 | 3134 |
| VM1 | 9/2 | 978 | 2538 |
| VM1 | 9/3 | 1018 | 3109 |
| VM1 | 9/4 | 1189 | 3511 |
| : | : | : | : |

FIG.3

| VM NAME (12a) | TREND PERIOD (12b) | MEMORY USE FREQUENCY (AVERAGE VALUE) (12c) |
|---|---|---|
| VM1 | NIGHTTIME | 1104 |
| VM2 | NIGHTTIME | 912 |
| VM3 | DAYTIME | 1301 |
| VM4 | DAYTIME | 1921 |
| VM5 | NIGHTTIME | 2189 |
| VM6 | NIGHTTIME | 1311 |

FIG.6

| DATE AND TIME | MOVED VM | MOVE ORIGIN VMM | MOVING DESTINATION VMM |
|---|---|---|---|
| 9/6 18:10:11 | VM5 | VMM1 | VMM5 |
| 9/6 18:25:34 | VM2 | VMM3 | VMM2 |
| 9/6 18:52:51 | VM3 | VMM3 | VMM6 |

FIG.15C

VMM PATCH MANAGEMENT REFERENCE SCREEN ~g3

| VMM NAME (g31) | RECOMMENDED PERIOD (g32) | DISPERSION VALUE (g33) |
|---|---|---|
| VMM1 | NIGHTTIME | 0.276 |
| VMM2 | DAYTIME OR NIGHTTIME | 0.302 |
| VMM3 | NIGHTTIME | 0 |

RETURN (g34)

FIG.15D

VM MOVE HISTORY REFERENCE SCREEN ~g4

| DATE AND TIME (g41) | MOVED VM (g42) | MOVE ORIGIN VMM (g43) | MOVING DESTINATION VMM (g44) |
|---|---|---|---|
| 9/6 18:10:11 | VM5 | VMM1 | VMM5 |
| 9/6 18:25:34 | VM2 | VMM3 | VMM2 |
| 9/6 18:52:51 | VM3 | VMM3 | VMM6 |

RETURN (g45)

FIG.16A

| VM NAME | 0~2 | 2~4 | 4~6 | 6~8 | 8~10 | 10~12 | 12~14 | 14~16 | 16~18 | 18~20 | 20~22 | 22~24 |
|---|---|---|---|---|---|---|---|---|---|---|---|---|
| VM1 | 200 | 300 | 200 | 400 | 1200 | 1000 | 1500 | 900 | 1100 | 800 | 600 | 400 |
| VM2 | 1200 | 1200 | 1200 | 1200 | 0 | 0 | 0 | 0 | 0 | 0 | 0 | 0 |
| : | : | : | : | : | : | : | : | : | : | : | : | : |

FIG.16B

| VM NAME | SUN | MON | TUE | WED | THU | FRI | SAT |
|---|---|---|---|---|---|---|---|
| VM1 | 200 | 1100 | 900 | 700 | 800 | 1000 | 400 |
| VM2 | 400 | 300 | 400 | 300 | 500 | 500 | 400 |
| : | : | : | : | : | : | : | : |

MANAGEMENT SERVER, PATCH SCHEDULING METHOD, AND RECORDING MEDIUM

CROSS-REFERENCE TO RELATED APPLICATION

This application is a continuation application of International Application PCT/JP2012/057072 filed on Mar. 19, 2012 and designating the U.S., the entire contents of which are incorporated herein by reference.

FIELD

The embodiments discussed herein are related to a management server, a patch scheduling method, and recording medium.

BACKGROUND

In recent years, a technique has been known by which a virtual machine (VM) that is currently working can be moved from a server in which the VM is constructed to another server without a halt. This technique is called "live migration". During a live migration, a management server copies a memory image of the working VM onto the server at the moving destination (hereinafter, "moving destination server"). Because the contents of the memory keep changing also during the copying process, the management server copies the difference caused by the change again. After repeating this process a plurality of times, the management server finally halts the VM at the origin of the move temporarily and copies the final difference. After that, the management server copies the state of the Central Processing Unit (CPU) and the like onto the moving destination and resumes the VMs at the moving destination after the copying process.

The live migration technique is used when an administrator applies a patch to virtual software (called "Virtual Machine Monitors [VMMs]") provided in a server. A specific example of a related VMM patch application will be explained, with reference to FIG. 18. FIG. 18 is a drawing for explaining the related VMM patch application. As illustrated in FIG. 18, in a server 1, VM 1, VM 2, and VM 3 are constructed with a VMM to which a patch has not yet been applied. To apply a patch to the VMM in the server 1, a management server moves VM 1, VM 2, and VM 3 from the server 1 to a different server ("server 2" in the present example) by executing a live migration. After that, when the VMs in the server 1 have been moved, the management server applies the patch to the VMM provided in the server 1.

Further, a method for determining a moving destination server for VMs is disclosed as another related technique. According to this method, to reduce downtime of the VMs caused by the moves, a management server determines an appropriate moving destination server by using an evaluation value that is calculated while taking into account a CPU usage percentage, a memory usage amount, and the time it takes to move the VMs, based on information collected from servers.

Patent Document 1: Japanese Laid-open Patent Publication No. 2008-217302

The related technique, however, has a problem where, when the administrator applies the patch to the VMM, it takes time for the management server to migrate the VMs grouped with the VMM to the moving destination by executing the live migration. In other words, if the management server executes the live migration while the frequency of use of the memory by the VMs is high, for example, because the contents of the memory change over a long period of time, it takes a long time to copy the difference at the final step.

Further, even if the management server determines the appropriate moving destination server, if the live migration is executed while the frequency of use of the memory by the VMs is high, the situation where the migration takes a long time remains unchanged.

SUMMARY

According to an aspect of the embodiments, a non-transitory computer-readable recording medium has stored therein a patch scheduling program that causes a computer to execute a process including: managing a system including a plurality of software that control a plurality of virtual machines; aggregating virtual machines including a similar trend regarding a predetermined index thereof with a mutually-same virtual software; determining a time period during which the virtual machines are to be moved, based on the trends of the virtual machines aggregated with the mutually-same virtual software and based on moving time of the move of the virtual machines to a different virtual software included in the plurality of virtual software; and scheduling applying a patch to each of the plurality of virtual software at the determined time periods.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a drawing of an exemplary data structure of a VM usage performance table according to the first embodiment;

FIG. 3 is a drawing of an exemplary data structure of a VM trend table according to the first embodiment;

FIG. 6 is a drawing of an exemplary data structure of a VM move history table according to the first embodiment;

FIG. 15C is a drawing of an example of a VMM patch management reference screen;

FIG. 15D is a drawing of an example of a VM move history reference screen;

FIG. 16A is a drawing of a data structure of a VM usage performance table for performing a measuring process by using a time span in units of two hours;

FIG. 16B is a drawing of a data structure of a VM usage performance table for performing a measuring process by using a time span in units of single days corresponding to the days of the week;

DESCRIPTION OF EMBODIMENTS

Preferred embodiments will be explained with reference to accompanying drawings. Examples in which a virtual machine system is applied to cloud computing will be explained; however, the present invention is not limited to the exemplary embodiments. Further, any of the exemplary embodiments may be carried out in combination as appropriate, as long as the combination does not cause any contradiction in the details of the processing.

[a] First Embodiment

A Configuration of a Virtual Machine System According to a First Embodiment

Figure 1:
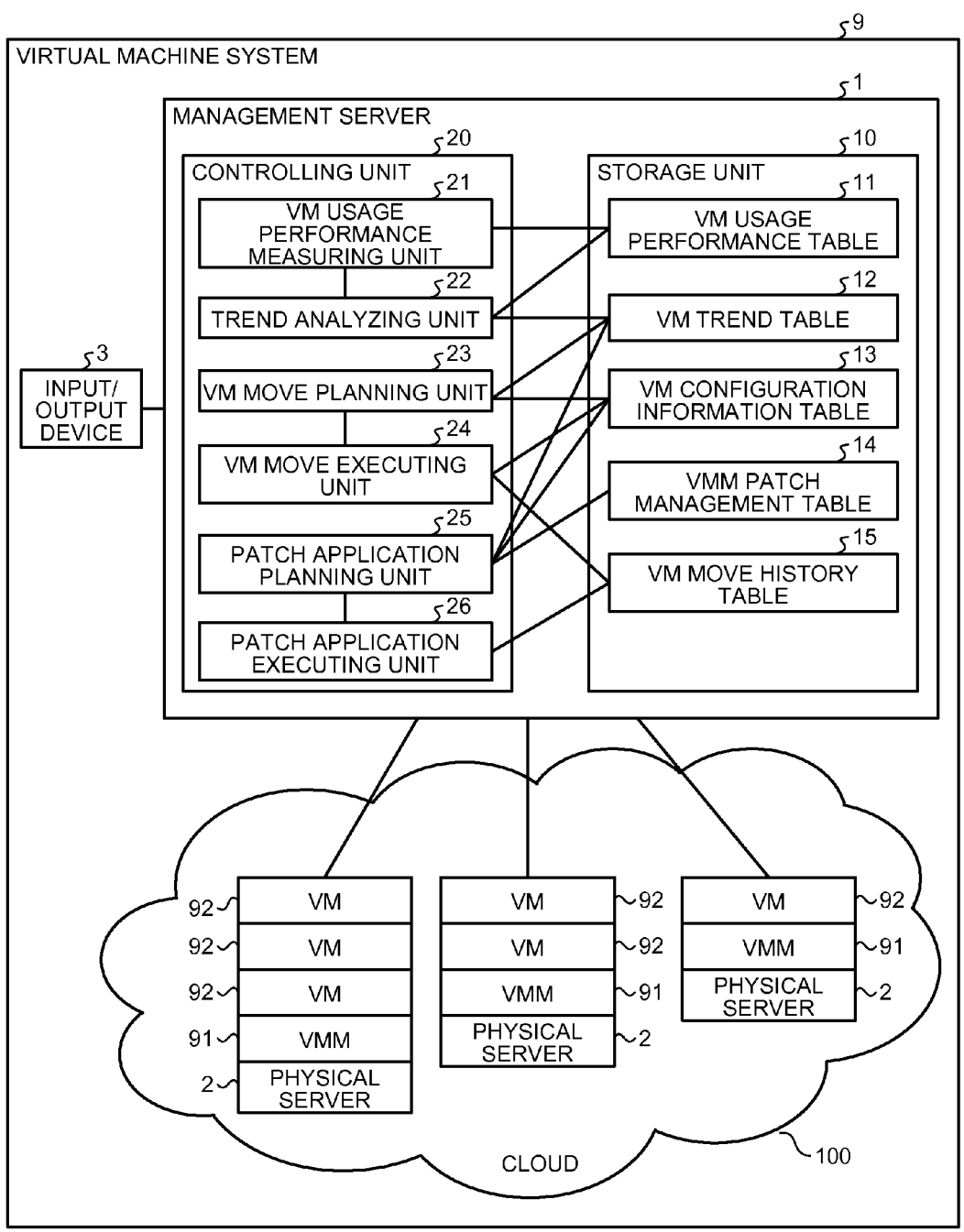
FIG. 1 is a functional block diagram of a virtual machine system according to a first embodiment.

FIG. 1 is a functional block diagram of a virtual machine system according to a first embodiment. As illustrated in FIG. 1, a virtual machine system 9 includes a management server 1 and a plurality of physical servers 2. The plurality of physical servers 2 are present in a cloud 100.

In this situation, the cloud 100 is able to provide users with services offered by the physical servers 2, without making the users conscious of any physical substance. Examples of the services offered by the physical servers 2 include "Desktop as a Service (DaaS)" which is a service to provide a virtual desktop environment and "Software as a Service (Saas)" which is a service to provide functions of application software. However, possible embodiments are not limited to these examples.

Each of the physical servers 2 includes a piece of virtual software called Virtual Machine Monitor (VMM) 91 and one or more Virtual Machines (VMs) 92. The VMM 91 is software that is needed for causing the VMs 92 to work and is configured to allocate resources such as a Central Processing Unit (CPU) and a memory that are installed in the physical server 2, and the like, to the VMs 92. The quantity of the VMMs 91 corresponds to the quantity of the physical servers 2; however, possible embodiments are not limited to the example illustrated in the drawing, and the quantities may vary. For example, the quantity of the VMMs 91 may be 128, but is not limited to this example. Further, the quantity of the VMs 92 that can be installed with each of the physical servers 2 is not limited to the example illustrated in the drawing, and the quantity may vary. For example, the quantity of the VMs 92 that can be installed may be 24, but is not limited to this example.

The management server 1 is connected to an input/output device 3. Further, the management server 1 includes a storage unit 10 and a controlling unit 20. The storage unit 10 corresponds to a storage device configured with a non-volatile semiconductor memory device such as a flash memory, a Ferroelectric Random Access Memory (FRAM—registered trademark), or the like. Further, the storage unit 10 includes a VM usage performance table 11, a VM trend table 12, a VM configuration information table 13, a VMM patch management table 14, and a VM move history table 15. The VM usage performance table 11 may be an example of the storage unit. The data structure of each of the tables will be explained later.

The input/output device 3 is configured to receive inputs of various types of requests and corresponds to a keyboard, a mouse, a microphone, and/or the like. Also, the input/output device 3 is configured to output contents of various types of tables and the like and corresponds to a display device (or a monitor, or a touch panel).

The controlling unit 20 includes an internal memory for storing therein a program defining various types of processing procedures and control data and is configured to perform various processes therewith. Further, for example, the controlling unit 20 corresponds to an integrated circuit such as an Application Specific Integrated Circuit (ASIC) or a Field Programmable Gate Array (FPGA) or an electronic circuit such as a Central Processing Unit (CPU) or a Micro Processing Unit (MPU). Further, the controlling unit 20 includes a VM usage performance measuring unit 21, a trend analyzing unit 22, a VM move planning unit 23, a VM move executing unit 24, a patch application planning unit 25, and a patch application executing unit 26.

The VM usage performance measuring unit 21 measures usage performance of each of the VMs 92 by using a predetermined time span and records a measured result into the VM usage performance table 11. The usage performance in the present example is an example of the predetermined index and may be represented by frequency with which the memory is used, such as frequency with which data is written into the memory, frequency with which data is read from the memory, or frequency combining these. Although the usage performance is explained as the frequency of use of the memory, possible embodiments are not limited to this example. The usage performance may be represented by a usage percentage of the CPU. It is acceptable use any index as the usage performance, as long as the differences in the usage performance of the VMs 92 among different time periods are made clear. In the following explanation, the predetermined usage performance will be represented by values the frequency of use of the memory (hereinafter, "memory use frequency values"). The predetermined time span in the present example is 12 hours, when each day is divided into a daytime period (8:00 to 20:00) and a nighttime period (20:00 to 8:00), for example. Although the predetermined time span is explained as 12 hours in the present example, possible embodiments are not limited to this example. The predetermined time span may be two hours, four hours, or each of the days of the week. It is acceptable to use any time length, as long as the differences in the usage performance of the VMs 92 among different time periods are made clear. In the following explanation, the predetermined time span will be 12 hours obtained by dividing each day into a daytime period and a nighttime period. In other words, the divided time periods obtained by using the predetermined time span are the daytime period and the nighttime period.

Next, a data structure of the VM usage performance table 11 will be explained, with reference to FIG. 2. FIG. 2 is a drawing of an exemplary data structure of the VM usage performance table according to the first embodiment. As illustrated in FIG. 2, the VM usage performance table 11 stores therein dates 11$b$, nighttime values 11$c$, and daytime values 11$d$ that are kept in correspondence with VM names 11$a$. Each of the VM names 11$a$ represents a name of a different one of the VMs 92. Each of the dates 11$b$ represents the date on which the memory use frequency value for the corresponding VM 92 was measured. Each of the nighttime values 11$c$ represents a memory use frequency value measured for the corresponding VM 92 during the nighttime period. Each of the daytime values 11$d$ represents a memory use frequency value measured for the corresponding VM 92 during the daytime period. In one example, the VM usage performance table 11 stores therein, for the VM name 11$a$ being "VM 1", "9/1" as a date 11$b$, "1232" as a nighttime value 11$c$, and "3134" as a daytime value 11$d$.

Returning to the description of FIG. 1, the trend analyzing unit 22 analyzes trends of the use of the memory based on the information stored in the VM usage performance table 11. The "trends" in the present example means trends of the memory use frequency values being small. For example, based on the memory use frequency values in the daytime periods and the nighttime periods stored in the VM usage performance table 11, the trend analyzing unit 22 calculates an average memory use frequency value for the daytime periods and for the nighttime periods, for each of the VMs 92. After that, by using the calculated average memory use frequency values for the daytime periods and for the nighttime periods, the trend analyzing unit 22 records the time period having the smaller memory use frequency value into the VM trend table 12, as a time period corresponding to the trends. In addition, the trend analyzing unit 22 records the average memory use frequency values in the time periods corresponding to the trends into the VM trend table 12. Hereinafter, the time periods corresponding to the trends will be referred to as "trend periods".

Next, a data structure of the VM trend table 12 will be explained, with reference to FIG. 3. FIG. 3 is a drawing of an exemplary data structure of the VM trend table according to the first embodiment. As illustrated in FIG. 3, the VM trend table 12 stores therein trend periods 12$b$ and (average) memory use frequency values 12$c$ that are kept in correspondence with VM names 12$a$. Each of the VM names 12$a$ represents the name of a different one of the VM. Each of the trend periods 12$b$ represents the time period corresponding to the trends, i.e., the trend period. Each of the (average) memory use frequency values 12$c$ represents an average value of the memory use frequency values during the time period indicated as the trend period. In one example, the VM trend table 12 stores therein, for the VM name 12$a$ being "VM 1", "nighttime" as a trend period 12$b$ and "1104" as an (average) memory use frequency value 12$c$.

Returning to the description of FIG. 1, based on the information stored in the VM trend table 12, the VM move planning unit 23 aggregates VMs 92 having a similar trend regarding the memory use frequency values thereof, with mutually the same VMM 91. In other words, to apply a patch to any of the VMMs 91, the VM move planning unit 23 gathers, in advance, such VMs 92 that have a similar trend of having a small memory use frequency value thereof, with mutually the same VMM 91. For example, the VM move planning unit 23 selects the trend period 12$b$ stored in the VM trend table 12 for each of the VMs 92. After that, the VM move planning unit 23 calculates, for each of the VMMs 91, a dispersion value of the memory use frequency values, with respect to the trend periods 12$b$ of the VMs 92 grouped with the VMM 91. After that, the VM move planning unit 23 selects one of the VMMs 91 having the largest dispersion value. Subsequently, the VM move planning unit 23 selects the one or more VMs 92 that are grouped with the selected VMM 91 and that correspond to the trend period in the smallest quantity. In other words, the VM move planning unit 23 selects the one or more VMs 92 that have a dissimilar trend regarding the memory use frequency values. In this situation, if there are two or more trend periods that are in the smallest quantity, the VM move planning unit 23 may select the one or more VMs 92 corresponding to any one of the trend periods. The selected VMs 92 will each serve as the VM to be moved (hereinafter, "move-target VM"). After that, to select a VMM 91 that serves as a moving destination (hereinafter, "moving destination VMM"), the VM move planning unit 23 selects such a VMM 91 that will have the smallest dispersion value when serving as a moving destination VMM 91 in the event that the move-target VM 92 is moved thereto. In this situation, if there are two or more VMMs 91 having the smallest dispersion value, the VM move planning unit 23 may select the VMM 91 with which the smallest quantity of VMs 92 are installed. The selected VMM 91 serves as the moving destination VMM. The dispersion values may be calculated as, for example, entropy values. However, possible embodiments are not limited to this example. It is acceptable to calculate the dispersion values as variance values or standard deviation values. In the following explanation, the dispersion values will be explained as entropy values.

According to the plan made by the VM move planning unit 23, the VM move executing unit 24 moves (which is referred to as "a live migration") the move-target VM 92 to the moving destination VMM 91. After that, the VM move executing unit 24 stores the VMs 92 that are grouped with the VMM 91 at the origin of the move (hereinafter, "move origin VMM 91") and the VMs 92 that are grouped with the moving destination VMM 91, into the VM configuration information table 13. Further, the VM move executing unit 24 stores information about the move of the VM 92 into the VM move history table 15, as a history. Processes performed by VM move planning unit 23 and the VM move executing unit 24 are repeatedly performed as many times as determined in advance by a user of the management server 1. As a result, it is possible to increase the number of VMMs 91 with which VMs 92 that have a similar trend of having a small memory use frequency value are aggregated. For example, the user may determine that the process is repeated twice a day; however, possible embodiments are not limited to this example.

Figure 4:
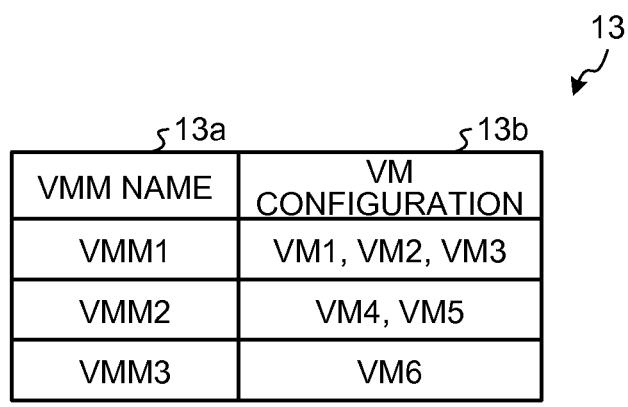
FIG. 4 is a drawing of an exemplary data structure of a VM configuration information table according to the first embodiment.

Next, a data structure of the VM configuration information table 13 will be explained, with reference to FIG. 4. FIG. 4 is a drawing of an exemplary data structure of the VM configuration information table according to the first embodiment. As illustrated in FIG. 4, the VM configuration information table 13 stores therein VM configurations 13$b$ kept in correspondence with VMM names 13$a$. Each of the VMM names 13$a$ represents a name of a different one of the VMMs. Each of the VM configurations 13$b$ represents the names of the one or more VMs that are configured to be grouped with the corresponding VMM. In one example, the VM configuration information table 13 stores therein, for the VMM name 13$a$ being "VMM 1", "VM 1, VM 2, and VM 3" as a VM configuration 13$b$.

Returning to the description of FIG. 1, based on the trends regarding the memory use frequency values of the VMs 92 aggregated with a VMM 91 and based on moving time of the move of the VMs 92 to a different VMM 91, the patch application planning unit 25 determines a time period during which the VMs 92 are to be moved. After that, the patch application planning unit 25 schedules applying a patch to the VMM 91 during the determined time period. For example, by referring to the VM trend table 12 and the VM configuration information table 13, the patch application planning unit 25 determines a recommended patch application time period (hereinafter, "recommended patch application period"), for each of the VMMs 91. In one example, the patch application planning unit 25 reads the VM configuration 13b corresponding to each of the VMMs 91, from the VM configuration information table 13. After that, for each of the VMMs 91, the patch application planning unit 25 reads the trend periods 12b of the VMs 92 indicated by the obtained VM configuration 13b, from the VM trend table 12. Subsequently, the patch application planning unit 25 counts the quantity of the time periods indicated as the trend periods 12b and determines the time period having the largest count as a patch application time period (hereinafter, "patch application period"). Further, the patch application planning unit 25 calculates a dispersion value of the memory use frequency values for each of the VMMs 91, with respect to the trend periods 12b of the VMs 92 grouped with the VMM 91. After that, the patch application planning unit 25 stores the patch application period and the dispersion value calculated for each of the VMMs 91, into the VMM patch management table 14.

Subsequently, based on the VMM patch management table 14, the patch application planning unit 25 sequentially selects as many VMMs 91 as a predetermined quantity, starting with the VMM 91 having the smallest dispersion value. After that, the patch application planning unit 25 schedules patch applications so that a patch is applied to each of the selected VMMs 91 at the respective patch application periods thereof. As for the method for scheduling the patch applications, for example, the patch application planning unit 25 may realize the scheduling of the patch applications by setting the patch application periods with scheduling software such as a job scheduler.

According to the schedule prepared by the patch application planning unit 25, the patch application executing unit 26 applies patches to the VMMs 91. When applying a patch to any of the VMMs 91, the patch application executing unit 26 moves all the VMs 92 grouped with the VMM 91 to which the patch is to be applied, to a different VMM 91. After that, the patch application executing unit 26 stores information about the move of the VMs 92 into the VM move history table 15, as a history. After that, when having moved all the VMs 92 to the different VMM 91, the patch application executing unit 26 executes the application of the patch to the VMM 91 serving as the patch application target. The method for selecting the moving destination VMM 91 is the same as the method used by the VM move planning unit 23 to select the moving destination VMM. Thus, the explanation thereof will be omitted.

Figure 5:
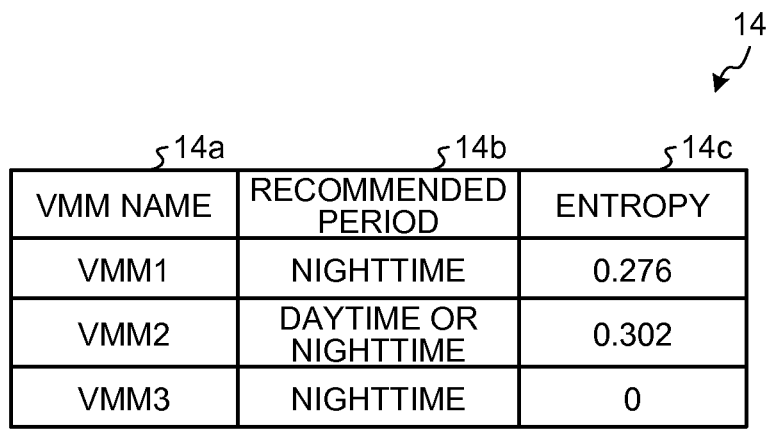
FIG. 5 is a drawing of an exemplary data structure of a VMM patch management table according to the first embodiment.

Next, a data structure of the VMM patch management table 14 will be explained, with reference to FIG. 5. FIG. 5 is a drawing of an exemplary data structure of the VMM patch management table according to the first embodiment. As illustrated in FIG. 5, the VMM patch management table 14 stores therein recommended time periods (hereinafter, "recommended periods") 14b and entropy values 14c that are kept in correspondence with VMM names 14a. Each of the VMM names 14a represents the name of a different one of the VMMs. Each of the recommended periods 14b represents a recommended patch application period. Each of the entropy values 14c represents a dispersion value (i.e., the entropy value) of the memory use frequency values with respect to the trend periods 12b of the VMs 92. In one example, the VMM patch management table 14 stores therein, for the VMM name 14a being "VMM 1", "nighttime" as a recommended period 14b and "0.276" as an entropy value 14c.

Next, a data structure of the VM move history table 15 will be explained, with reference to FIG. 6. FIG. 6 is a drawing of an exemplary data structure of the VM move history table according to the first embodiment. As illustrated in FIG. 6, the VM move history table 15 stores therein sets of date and time 15a, moved VMs 15b, move origin VMMs 15c, and moving destination VMMs 15d that are kept in correspondence with one another. Each of the sets of date and time 15a represents a date and time at which the corresponding VM was moved. Each of the moved VMs 15b represents a move-target VM 92. Each of the move origin VMMs 15c represents a move origin VMM 91 of the corresponding move-target VM 92. Each of the moving destination VMMs 15d represents a moving destination VMM 91 of the corresponding move-target VM 92. In one example, the VM move history table 15 stores therein, for a set of date and time 15a being "9/6 18:10:11", "VM 5" as a moved VM 15b, "VMM 1" as a move origin VMM 15c, and "VMM 5" as a moving destination VMM 15d.

Figure 7A:
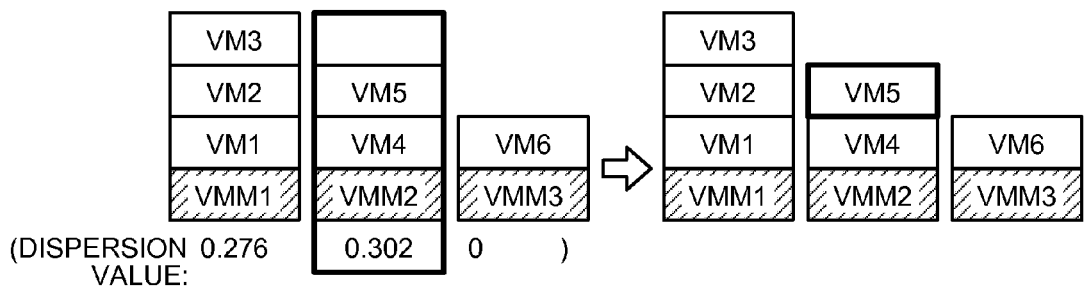
FIG. 7A is a first drawing for specifically explaining a VM move planning process and a VM move executing process according to the first embodiment.
Figure 7B:
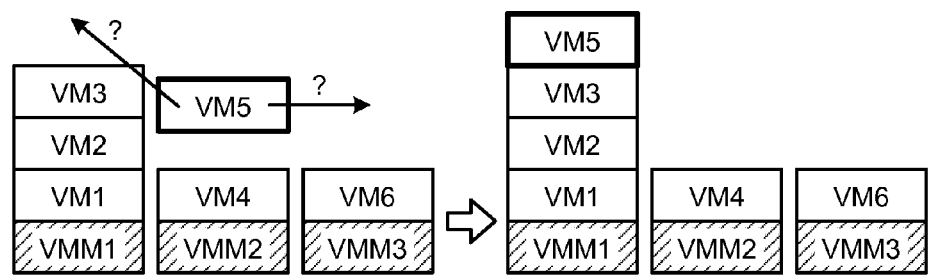
FIG. 7B is a second drawing for specifically explaining the VM move planning process and the VM move executing process according to the first embodiment.
Figure 7C:
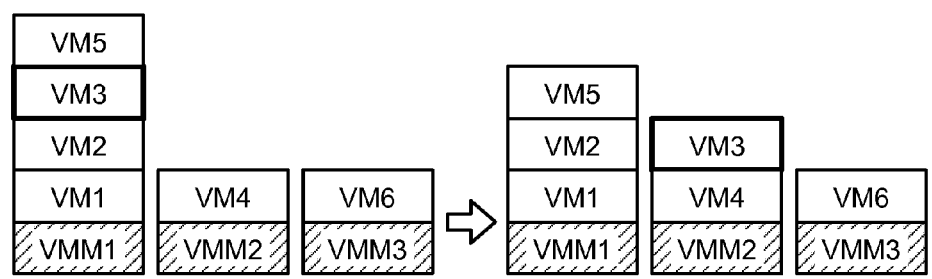
FIG. 7C is a third drawing for specifically explaining the VM move planning process and the VM move executing process according to the first embodiment.

Next, specific examples of a VM move planning process performed by the VM move planning unit 23 and a VM move executing process performed by the VM move executing unit 24 will be explained, with reference to FIGS. 7A, 7B, and 7C. FIGS. 7A, 7B, and 7C are drawings for specifically explaining the VM move planning process and the VM move executing process according to the first embodiment. It is assumed that the trend analyzing unit 22 has analyzed trends and has recorded an analysis result into the VM trend table 12 with the contents illustrated in FIG. 3.

As illustrated on the left side of FIG. 7A, the VM move planning unit 23 calculates an entropy value for each of the VMMs, with respect to the trend periods of the VMs grouped with the VMM. In the present example, the VM move planning unit 23 calculates the entropy value with respect to the trend periods of the VMs grouped with each of VMMs 1 to 3. For VMM 1, because the VMs have one daytime trend period and two nighttime trend periods, an entropy value $H_{VMM1}$ is calculated as follows:

$$H_{VMM1} = -1/3 \log 1/3 - 2/3 \log 2/3 = 0.276$$

For VMM 2, because the VMs have one daytime trend period and one nighttime trend period, an entropy value $H_{VMM2}$ is calculated as follows:

$$H_{VMM2} = -1/2 \log 1/2 - 1/2 \log 1/2 = 0.302$$

For VMM 3, because the VMs have no daytime trend period and one nighttime trend period, an entropy value $H_{VMM3}$ is calculated as follows:

$$H_{VMM3} = -1 \log 1 = 0$$

After that, the VM move planning unit 23 selects one of the VMMs that has the largest entropy value, i.e., the largest dispersion value of the memory use frequency values. In the present example, the VM move planning unit 23 selects VMM 2.

As illustrated on the right side of FIG. 7A, the VM move planning unit 23 selects such a VM that is grouped with the selected VMM and that corresponds the trend period in the smallest quantity. In the present example, because the trend periods of the VMs 4 and 5 grouped with the selected VMM 2 are the daytime period and the nighttime period, respectively, the VM move planning unit 23 may select either one of the VMs. In one example, the VM move planning unit 23 selects VM 5. In other words, VM 5 is determined as the move-target VM.

As illustrated on the left side of FIG. 7B, to select a moving destination VMM, the VM move planning unit 23 selects such a VMM that will have the smallest entropy value when serving as a moving destination VMM in the event that the move-target VM is moved thereto. In the present example, the VM move planning unit 23 calculates an entropy value $H'_{VMM1}$ for when the move-target VM 5 is moved to VMM 1, as follows:

$$H'_{VMM1} = -1/4 \log 1/4 - 3/4 \log 3/4 = 0.245$$

Further, the VM move planning unit 23 calculates an entropy value $H'_3$ for when the move-target VM 5 is moved to VMM 3 as follows:

$$H'_{VMM3} = -1 \log 1 = 0$$

Accordingly, the VM move planning unit 23 learns that the entropy value changes from 0.276 to 0.245 if VM 5 is moved to VMM 1 and that the entropy value changes from 0 to 0 if VM 5 is moved to VMM 3. Thus, because the entropy will be the smallest if VM 5 is moved to VMM 1, the VM move planning unit 23 selects VMM 1. In other words, VMM 1 is determined as the moving destination VMM.

After that, as illustrated on the right side of FIG. 7B, according to the plan made by the VM move planning unit 23, the VM move executing unit 24 moves VM 5 determined as the move-target VM to VMM 1 determined as the moving destination VMM. Subsequently, processes performed by the VM move planning unit 23 and the VM move executing unit 24 are repeatedly performed.

As illustrated on the left side of FIG. 7C, similarly, the VM move planning unit 23 selects VMM 1 having the largest entropy value and selects VM 3 that is one of the VMs grouped with the selected VMM 1 and that corresponds to the trend period in the smallest quantity. After that, when VM 3 is moved to another VMM, the entropy value will be the smallest if VM 3 is moved to VMM 2, in the present example. Thus, the VM move planning unit 23 selects VMM 2 as the moving destination VMM.

After that, as illustrated on the right side of FIG. 7C, according to the plan made by the VM move planning unit 23, the VM move executing unit 24 moves VM 3 determined as the move-target VM, to VMM 2 determined as the moving destination VMM.

Figure 8:
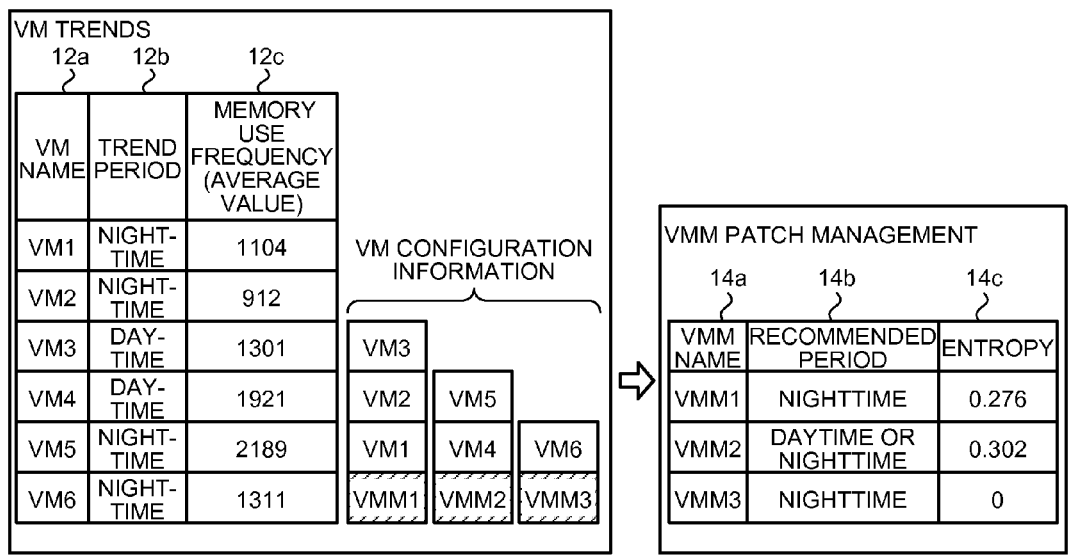
FIG. 8 is a drawing for specifically explaining a patch application planning process according to the first embodiment.

Next, a specific example of the patch application planning process performed by the patch application planning unit 25 will be explained, with reference to FIG. 8. FIG. 8 is a drawing for specifically explaining the patch application planning process according to the first embodiment. It is assumed that the trend analyzing unit 22 has analyzed trends and has recorded an analysis result into the VM trend table 12. It is also assumed that the VM move executing unit 24 has moved the VMs according to the VM move plan made by the VM move planning unit 23 and has recorded the changed VM configuration resulting from the move, into the VM configuration information table 13.

The contents of the VM trends recorded into the VM trend table 12 are illustrated on the left side of FIG. 8. In addition, the VM configuration information recorded in the VM configuration information table 13 is illustrated on the left side of FIG. 8.

By referring to the contents of the VM trends and the VM configuration information, the patch application planning unit 25 obtains a recommended patch application period for each of the VMMs. In the present example, with regard to VMM 1, the patch application planning unit 25 obtains VMs 1 to 3 from the VM configuration information. After that, the patch application planning unit 25 obtains the trend periods 12b of VMs 1 to 3, from the contents of the VM trends. Subsequently, the patch application planning unit 25 counts the quantity of the time periods indicated as the trend periods 12b and determines the time period having the largest count as a recommended patch application period. Because the count of the nighttime periods is 2, whereas the count of the daytime periods is 1, the patch application planning unit 25 determines the nighttime period as the recommended patch application period.

Similarly, the patch application planning unit 25 determines either the nighttime period or the daytime period as a recommended patch application period for VMM 2 and determines the nighttime period as a recommended patch application period for VMM 3. After that, the patch application planning unit 25 stores the recommended patch application periods determined for VMMs 1 to 3, into the VMM patch management table 14. As illustrated on the right side of FIG. 8, the VMM patch management table 14 stores therein the recommended periods 14b for applying a patch to each of VMMs 1 to 3.

Further, the patch application planning unit 25 calculates an entropy value for each of the VMMs, with respect to the trend periods 12b of the VMs grouped with the VMM. In the present example, for VMM 1, because the VMs have one daytime trend period and two nighttime trend periods, the entropy value is calculated as 0.276. For VMM 2, because the VMs have one daytime trend period and one nighttime trend period, the entropy value is calculated as 0.302. For VMM 3, because the VMs have no daytime trend period and one nighttime trend period, the entropy value is calculated as 0. After that, the patch application planning unit 25 stores the entropy values calculated for VMMs 1 to 3 into the VMM patch management table 14. As illustrated on the right side of FIG. 8, the VMM patch management table 14 stores therein the entropy values 14c calculated for VMMs 1 to 3.

After that, based on the VMM patch management table 14, the patch application planning unit 25 sequentially selects as many VMMs as a predetermined quantity, starting with the VMM having the smallest entropy value. Subsequently, the patch application planning unit 25 schedules the patch applications so that a patch is applied to each of the selected VMMs at the respective recommended patch application periods thereof. In the present example, if the predetermined quantity is "1", the patch application planning unit 25 selects VMM 3 having the smallest entropy value and schedules the patch application so that a patch is applied to the selected VMM 3 during the nighttime period.

A Procedure in the Trend Analyzing Process

Figure 9:
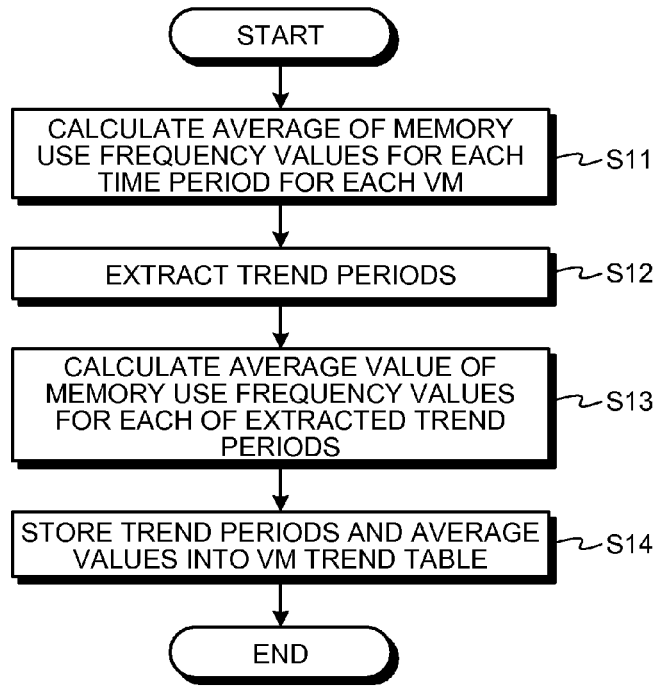
FIG. 9 is a flowchart of a procedure in a trend analyzing process according to the first embodiment.

Next, a procedure in the trend analyzing process performed by the trend analyzing unit 22 will be explained, with reference to FIG. 9. FIG. 9 is a flowchart of the procedure in the trend analyzing process according to the first embodiment. It is assumed that the VM usage performance measuring unit 21 has measured memory use frequency values of the VMs 92 by using a predetermined time span and has recorded a measured result into the VM usage performance table 11. In the present example, the predetermined time span is 12 hours obtained by dividing each day into a daytime period (8:00 to 20:00) and a nighttime period (20:00 to 8:00). Further, when information corresponding to ten days, for example, has been accumulated in the VM usage performance table 11, the trend analyzing unit 22 determines that it has been requested to perform a trend analysis.

When it has been requested to perform a trend analysis, the trend analyzing unit 22 calculates an average value of the memory use frequency values for each of the time periods for each of the VMs 92 (step S11). For example, based on the memory use frequency values for the daytime periods and the nighttime periods stored in the VM usage performance table 11, the trend analyzing unit 22 calculates the average value of the memory use frequency values for the daytime period and for the nighttime period, for each of the VMs 92.

After that, the trend analyzing unit 22 extracts a trend period for each of the VMs 92 (step S12). For example, by using the calculated average values of the memory use frequency values for the daytime period and for the nighttime period, the trend analyzing unit 22 extracts the time period having the smaller memory use frequency value as a trend period.

After that, the trend analyzing unit 22 calculates an average value of the memory use frequency values in the extracted trend period, for each of the VMs 92 (step S13). Subsequently, the trend analyzing unit 22 records the trend period and the calculated average value for each of the VMs 92, into the VM trend table 12 (step S14).

A Procedure in the VM Move Planning Process

Figure 10:
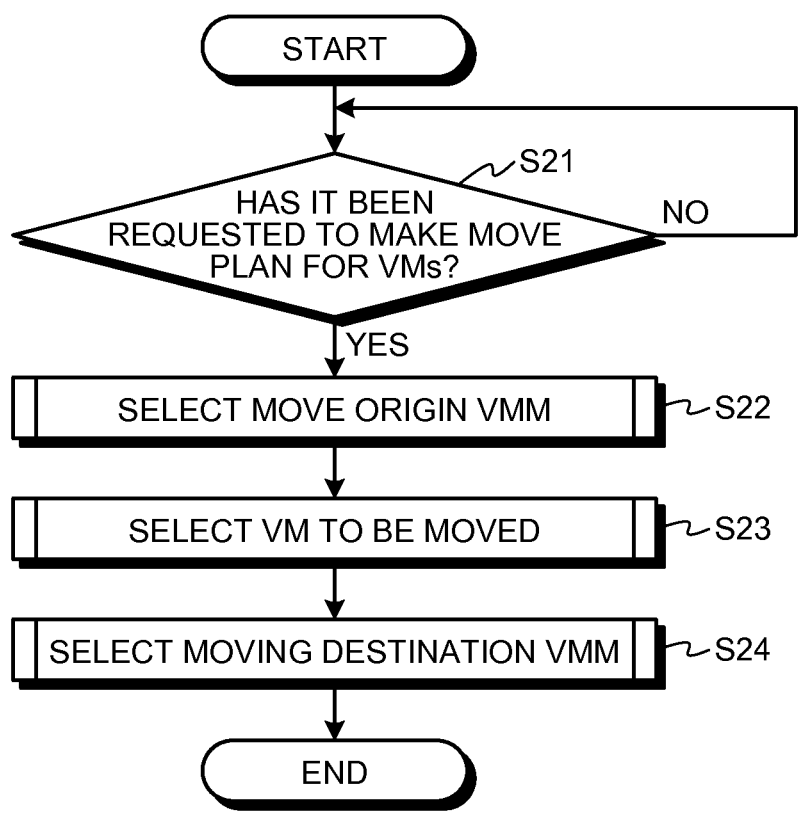
FIG. 10 is a flowchart of a procedure in the VM move planning process according to the first embodiment.

Next, a procedure in the VM move planning process performed by the VM move planning unit 23 will be explained, with reference to FIG. 10. FIG. 10 is a flowchart of the procedure in the VM move planning process according to the first embodiment. It is assumed that a request for a VM move plan has been output from the input/output device 3. The request for a VM move plan is output twice a day, for example.

First, the VM move planning unit 23 judges whether it has been requested to make a move plan for the VMs 92 (step S21). When having judged that it has not been requested to make a move plan for the VMs 92 (step S21: No), the VM move planning unit 23 repeatedly performs the judging process until it is requested to make a move plan for the VMs 92. On the contrary, when having judged that it has been requested to make a move plan for the VMs 92 (step S21: Yes), the VM move planning unit 23 selects one of the VMMs 91 to be a move origin VMM (step S22).

After that, the VM move planning unit 23 selects a VM 92 to be moved, from among the VMs 92 grouped with the selected VMM 91 (step S23). Further, the VM move planning unit 23 selects one of the VMMs 91 to serve as the moving destination to which the selected VM 92 is to be moved (step S24).

A Procedure in the Move Origin VMM Selecting Process

Figure 11:
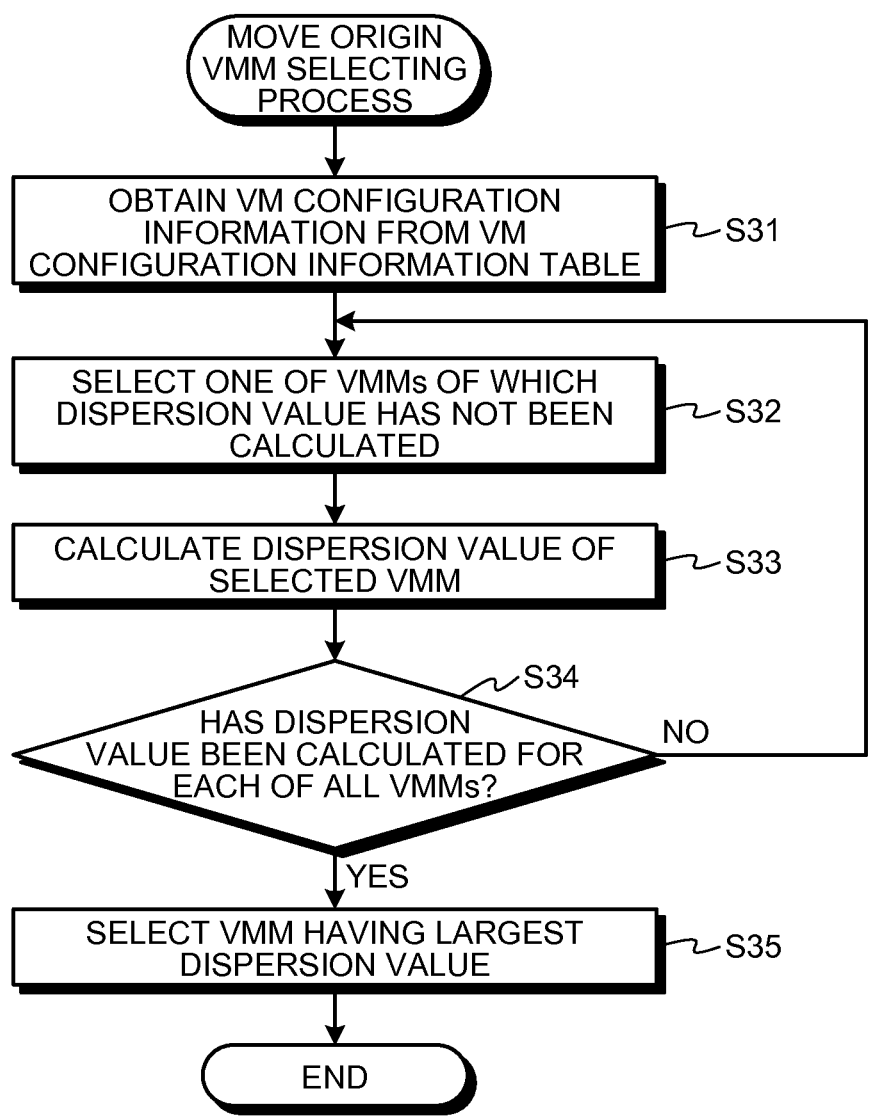
FIG. 11 is a flowchart of a procedure in a process to select a VMM at the origin of a move.

Next, a procedure in the move origin VMM selecting process performed at step S22 in FIG. 10 will be explained, with reference to FIG. 11. FIG. 11 is a flowchart of a procedure in the process to select the move origin VMM.

The VM move planning unit 23 obtains VM configuration information for each of the VMMs, from the VM configuration information table 13 (step S31). After that, the VM move planning unit 23 selects one of the VMMs 91 of which the dispersion value has not been calculated (step S32). The dispersion value may be an entropy value, for example.

Subsequently, the VM move planning unit 23 calculates a dispersion value of the memory use frequency values for the selected VMM 91 (step S33). For example, the VM move planning unit 23 selects the VMs 92 grouped with the selected VMM 91, from the VM configuration information. After that, by referring to the trend periods 12b of the selected VMs 92 stored in the VM trend table 12, the VM move planning unit 23 calculates a dispersion value of the memory use frequency values, with respect to the trend periods 12b of the VMs 92 grouped with the selected VMM 91.

After that, the VM move planning unit 23 judges whether the dispersion value has been calculated for each of all the VMMs 91 (step S34). When having judged that the dispersion value has not been calculated for each of all the VMMs 91 (step S34: No), the VM move planning unit 23 proceeds to step S32. On the contrary, when having judged that the dispersion value has been calculated for each of all the VMMs 91 (step S34: Yes), the VM move planning unit 23 selects one of the VMMs 91 having the largest dispersion value (step S35). The selected VMM 91 will serve as the move origin VMM.

A Procedure in the Moved MV Selecting Process

Figure 12:
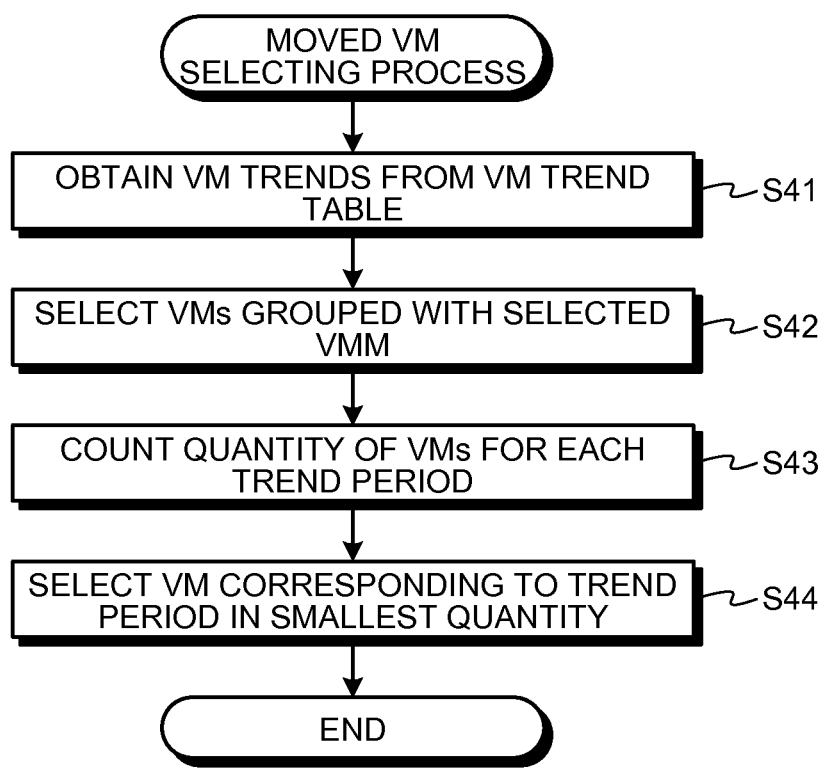
FIG. 12 is a flowchart of a procedure in a process to select a VM to be moved.

Next, a procedure in the moved VM selecting process performed at step S23 in FIG. 10 will be explained, with reference to FIG. 12. FIG. 12 is a flowchart of the procedure in the process to select a VM to be moved.

The VM move planning unit 23 obtains a VM trend for each of the VMs 92, from the VM trend table 12 (step S41). After that, the VM move planning unit 23 selects the VMs 92 grouped with the VMM 91 selected as the move origin VMM, from the VM configuration information (step S42).

Subsequently, the VM move planning unit 23 counts the quantity of the VMs 92 for each of the trend periods (step S43). In the present example, because the trend periods are the daytime period and the nighttime period, the VM move planning unit 23 counts the quantity of the VMs 92 for each of the time periods.

After that, the VM move planning unit 23 selects the one or more VMs 92 corresponding to the trend period in the smallest quantity (step S44). The selected VMs 92 will each serve as a move-target VM.

A Procedure in the Moving Destination VMM Selecting Process

Figure 13:
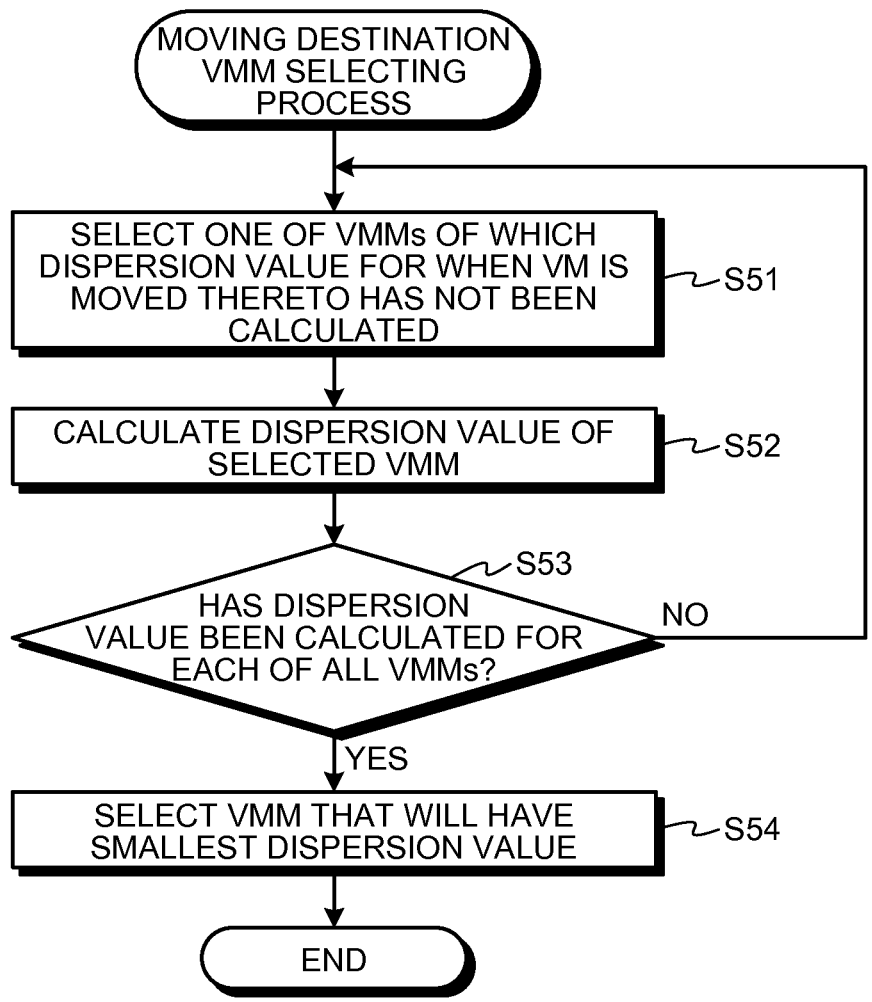
FIG. 13 is a flowchart of a procedure in a process to select a VMM to be a moving destination.

Next, a procedure in the moving destination VMM selecting process performed at step S24 in FIG. 10 will be explained, with reference to FIG. 13. FIG. 13 is a flowchart of the procedure in the process to select a VMM to be a moving destination.

The VM move planning unit 23 selects one of the VMMs 91 of which a dispersion value for when the VMM 91 becomes the moving destination of the move-target VM 92 has not been calculated (step S51). After that, the VM move planning unit 23 calculates a dispersion value of the memory use frequency values of the selected VMM 91 (step S52). For example, by referring to the trend periods 12b of the VMs 92 obtained by adding the move-target VM 92 to the VMs 92 grouped with the selected VMM 91, the VM move planning unit 23 calculates a dispersion value of the memory use frequency values, with respect to the trend periods 12b of the VMs 92.

After that, the VM move planning unit 23 judges whether the dispersion value has been calculated for each of all the VMMs 91 (step S53). When having judged that the dispersion value has not been calculated for each of all the VMMs 91 (step S53: No), the VM move planning unit 23 proceeds to step S51.

On the contrary, when having judged that the dispersion value has been calculated for each of all the VMMs 91 (step S53: Yes), the VM move planning unit 23 selects one of the VMMs 91 that will have the smallest dispersion value (step S54). The selected VMM 91 will serve as the moving destination VMM. After that, the VM move executing unit 24 moves the move-target VM 92 to the moving destination VMM 91, according to the plan made by the VM move planning unit 23.

A Procedure in the Patch Application Planning Process

Figure 14:
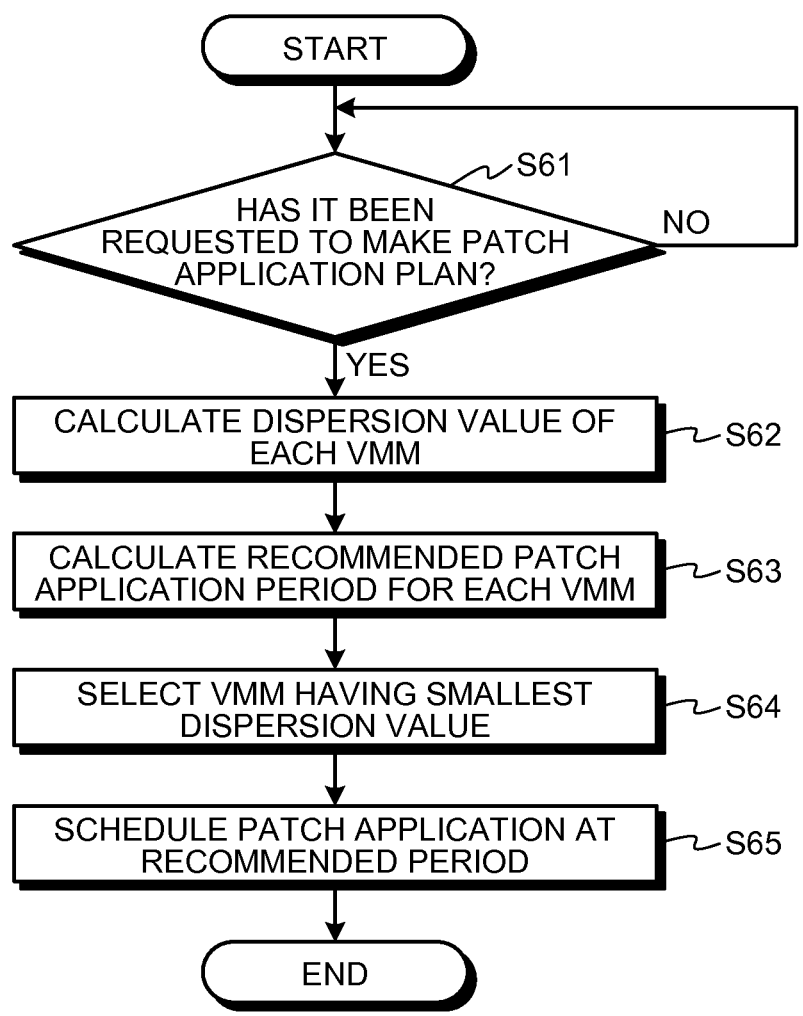
FIG. 14 is a flowchart of a procedure in the patch application planning process according to the first embodiment.

Next, a procedure in the patch application planning process performed by the patch application planning unit 25 will be explained, with reference to FIG. 14. FIG. 14 is a flowchart of the procedure in the patch application planning process according to the first embodiment. It is assumed that a request for a patch application plan has been output from the input/output device 3. The request for a patch application plan is output when, for example, a need arises to apply a patch to any of the VMMs 91.

First, the patch application planning unit 25 judges whether it has been requested to make a patch application plan (step S61). When having judged that it has not been requested to make a patch application plan (step S61: No), the patch application planning unit 25 repeatedly performs the judging process until it is requested to make a patch application plan.

On the contrary, when having judged that it has been requested to make a patch application plan (step S61: Yes), the patch application planning unit 25 calculates a dispersion value of the memory use frequency values for each of the VMMs (step S62). For example, by referring to the VM trend table 12, the patch application planning unit 25 calculates a dispersion value of the memory use frequency values for each of the VMMs 91 stored in the VM configuration information table 13, with respect to the trend periods 12b of the VMs 92 grouped with the VMM 91.

Subsequently, the patch application planning unit 25 calculates a recommended patch application period for each of the VMMs 91 (step S63). For example, by referring to the VM trend table 12, the patch application planning unit 25 counts the quantity of the trend periods for each of the VMMs 91 and determines the trend period having the largest count as a patch application period.

After that, the patch application planning unit 25 selects one of the VMMs 91 having the smallest dispersion value (step S64). Subsequently, the patch application planning unit 25 schedules a patch application so that a patch is applied to the selected VMM 91 at the recommended patch application period (step S65). After that, the patch application executing unit 26 applies the patch to the selected VMM 91 according to the schedule prepared by the patch application planning unit 25.

Figure 15A:
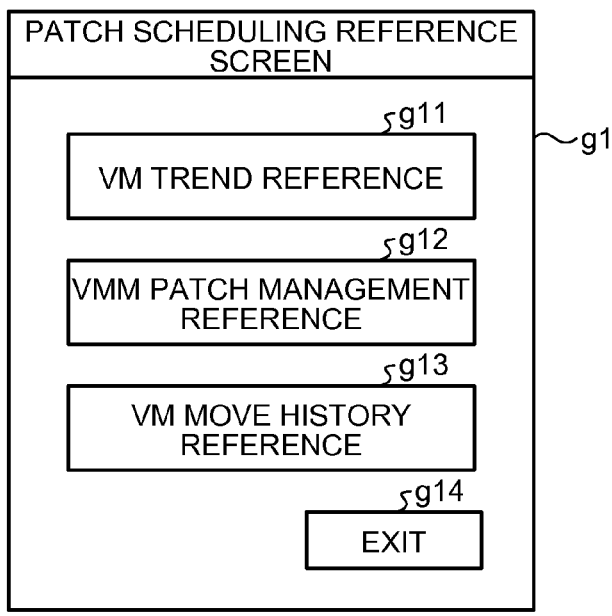
FIG. 15A is a drawing of an example of a patch scheduling reference screen.
Figure 15B:
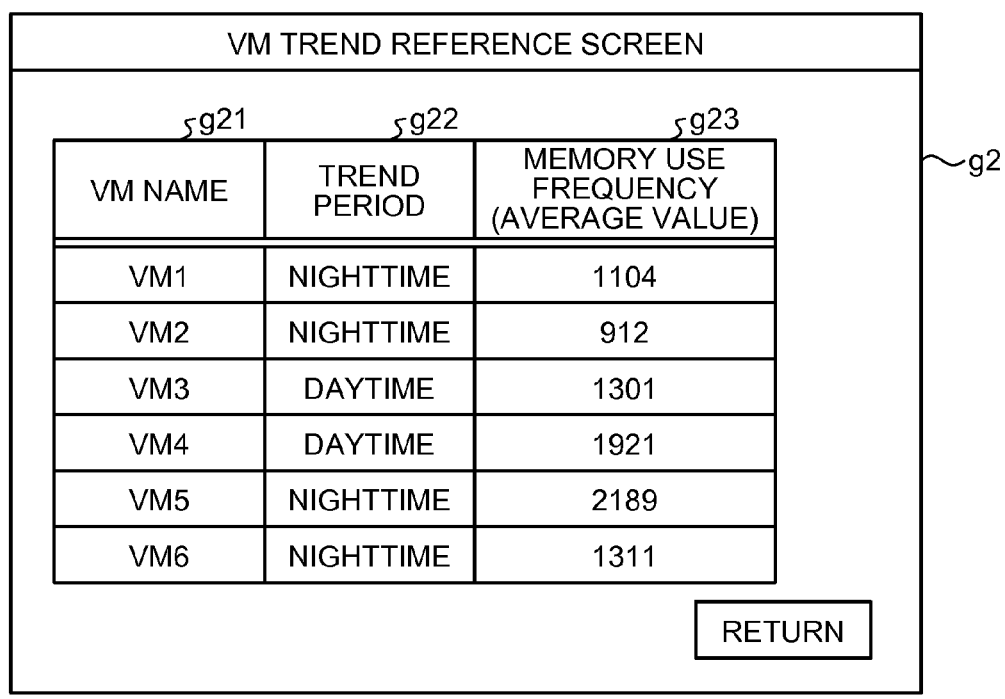
FIG. 15B is a drawing of an example of a VM trend reference screen.

It is also acceptable for the controlling unit 20 to have an arrangement so that the contents of the various types of tables generated and updated by the patch scheduling process described above are referred to by using a Graphical User Interface (GUI). FIG. 15A is a drawing of an example of a patch scheduling reference screen, which is a top screen used for referring to the various types of tables. FIG. 15B is a drawing of an example of a VM trend reference screen used for referring to contents of the VM trend table 12. FIG. 15C is a drawing of an example of a VMM patch management reference screen used for referring to contents of the VMM patch management table 14. FIG. 15D is a drawing of an example of a VM move history reference screen used for referring to contents of the VM move history table 15.

As illustrated in FIG. 15A, on the input/output device 3, a VM trend reference button g11, a VMM patch management reference button g12, a VM move history reference button g13, and an exit button g14 are displayed on a patch scheduling reference screen g1. The VM trend reference button g11 is a button used for referring to the VM trend table 12. The VMM patch management reference button g12 is a button used for referring to the VMM patch management table 14. The VM move history reference button g13 is a button used for referring to the VM move history table 15. The exit button g14 is a button used for exiting the patch scheduling reference screen g1.

As illustrated in FIG. 15B, on the input/output device 3, VM names g21, trend periods g22, (average) memory use frequency values g23, and a return button g24 are displayed on a VM trend reference screen g2. The VM names g21, the trend periods g22, and the (average) memory use frequency values g23 correspond to the VM names 12a, the trend periods 12b, and the (average) memory use frequency values 12c, respectively, that are stored in the VM trend table 12. The return button g24 is a button used for returning to the patch scheduling reference screen g1 at the beginning. For example, when having received a request indicating that the VM trend reference screen be displayed, the controlling unit 20 displays information based on the contents stored in the VM trend table 12. In one example, on the VM trend reference screen g2, for the VM name g21 being "VM 1", "nighttime" is displayed as a trend period g22, whereas "1104" is displayed as an (average) memory use frequency value g23.

As illustrated in FIG. 15C, on the input/output device 3, VMM names g31, recommended periods g32, dispersion values g33, and a return button g34 are displayed on a VMM patch management reference screen g3. The VMM names g31, the recommended periods g32, and the dispersion values g33 correspond to the VMM names 14a, the recommended periods 14b, and the entropy values 14c, respectively, that are stored in the VMM patch management table 14. The return button g34 is a button used for returning to the patch scheduling reference screen g1 at the beginning. For example, when having received a request indicating that the VMM patch management reference screen g3 be displayed, the controlling unit 20 displays information based on the contents stored in the VMM patch management table 14. In one example, on the VMM patch management reference screen g3, for the VMM name g31 being "VMM 1", "nighttime" is displayed as a recommended period g32, whereas "0.276" is displayed as a dispersion value g33.

As illustrated in FIG. 15D, on the input/output device 3, sets of date and time g41, moved VMs g42, move origin VMMs g43, moving destination VMMs g44, and a return button g45 are displayed on a VM move history reference screen g4. The sets of date and time g41, the moved VMs g42, the move origin VMMs g43, and the moving destination VMMs g44 correspond to the sets of date and time 15a, the moved VMs 15b, the move origin VMMs 15c, and the moving destination VMMs 15d, respectively, that are stored in the VM move history table 15. The return button g45 is a button used for returning to the patch scheduling reference screen g1 at the beginning. For example, when having received a request indicating that the VM move history reference screen g4 be displayed, the controlling unit 20 displays information based on the contents stored in the VM move history table 15. In one example, on the VM move history reference screen g4, for the set of date and time g41 being "9/6 18:10:11", "VM 5" is displayed as a moved VM g42, "VMM 1" is displayed as a move origin VMM g43, and "VMM 5" is displayed as a moving destination VMM g44.

As a result, by referring to the contents of the various types of tables as appropriate, the user is able to recognize the dispersion in the trend periods of each of the VMMs 91 on which the patch scheduling process has been performed.

Advantageous Effects of the First Embodiment

According to the first embodiment, the management server 1 aggregates the VMs 92 having a similar trend regarding the predetermined index (e.g., the memory use frequency values) thereof with mutually the same VMM 91. After that, based on the trends of the VMs 92 aggregated with each of the VMMs 91 and based on the moving time of the move of the VMs 92 to a different VMM 91, the management server 1 determines the time period during which the VMs 92 are to be moved. Further, the patch application planning unit 25 schedules applying the patches to the VMMs 91 at the determined time periods. With this arrangement, when a patch is applied to any of the VMMs 91, the management server 1 is able to shorten the moving time of the move (the live migration) of the VMs 92 aggregated with the VMM 91 to a different VMM 91.

Further, according to the first embodiment, the management server 1 selects, for each of the VMMs 91, the time period having a smaller memory use frequency value than the other time periods recorded in the VM usage performance table 11. After that, the management server 1 calculates a dispersion value of the memory use frequency values with respect to the selected time period.

Subsequently, the management server 1 moves (executes a live migration on) the VMs 92 grouped with the VMM 91 having the largest calculated dispersion value to the different VMM 91. With this arrangement, the management server 1 moves, to the different VMM 91, such VMs 92 that are grouped with the VMM 91 having the largest dispersion value with respect to the time periods of the VMs 92 grouped with the VMMs 91. Thus, it is possible to keep the dispersion value small for the memory use frequency values of the move origin VMM 91.

Further, according to the first embodiment, as for the move-target VM 92, the management server 1 moves such a VM 92 that is grouped with the VMM 91 having the largest calculated dispersion value and that corresponds to the time period having a dissimilar trend regarding the memory use frequency values, to the different VMM 91. With this arrangement, the management server 1 moves the VM 92 that is grouped with the VMM 91 having the largest dispersion value and that has the dissimilar period, to the different VMM 91. Thus, it is possible to keep the dispersion value small for the move origin VMM 91. As a result, when a patch is applied to any of the VMMs 91, the management server 1 is able to shorten the moving time of the VMs 92 grouped with the VMM 91.

Further, according to the first embodiment, the management server 1 further selects such a VMM 91 that will have the smallest dispersion value of the memory use frequency values when serving as a moving destination VMM 91 in the event that the move-target VM 92 is moved thereto and moves (executes a live migration on) the move-target VM 92 to the selected VMM 91. With this arrangement, the management server 1 is able to aggregate the VMs 92 that are similar to one another regarding the time periods having smaller memory use frequency values, to the moving destination VMM 91. Consequently, when a patch is applied to the VMM 91, it is possible to shorten the moving time of the VMs 92 grouped with the VMM 91.

Further, according to the first embodiment, the management server 1 repeatedly performs the process of aggregating similar VMs 92 with mutually the same VMMs 91. With this arrangement, because the management server 1 repeatedly performs the aggregating process, the management server 1 is able to aggregate the similar VMs 92 with each of the VMMs 91 with a high level of precision. As a result, when patches are sequentially applied to the VMMs, the management server 1 is able to shorten the moving time of the VMs 92 grouped with each of the VMMs 91 and is thus able to shorten the overall patch application time.

[b] Second Embodiment

In the first embodiment, the management server 1 uses 12 hours as the time span used for the measuring process performed by the VM usage performance measuring unit 21 and determines either the nighttime period or the daytime period as the time period (i.e., the trend period) exhibiting the trend of having a small memory use frequency value. In other words, the time span of the trend periods used by the management server 1 is fixed. However, possible embodiments are not limited to this example. The management server 1 may use a variable time span for the trend periods and may dynamically select the time span. In a second embodiment, the management server 1 that dynamically selects the time span that can be used as the trend periods will be explained.

The controlling unit 20 selects a time span that can be used as the trend periods. The time span that can be used as the trend periods may be in units of two hours or may be in units of single days corresponding to the days of the week. For example, the storage unit 10 included in the management server 1 includes two types of VM usage performance tables 11. The VM usage performance table 11 of the first type is a table for performing the measuring process by using a time span in units of two hours. The VM usage performance table 11 of the second type is a table for performing the measuring process by using a time span in units of single days corresponding to the days of the week. Further, before performing the patch scheduling process, the controlling unit 20 measures the memory use frequency values of each of the VMs 92 by using the two-hour time span and the one-day time span and records a measured result into each of the VM usage performance tables 11.

Next, data structures of the two types of VM usage performance tables 11 will be explained, with reference to FIGS. 16A and 16B. FIG. 16A is a drawing of the data structure of the VM usage performance table for performing the measuring process by using the time span in units of two hours. FIG. 16B is a drawing of the data structure of the VM usage performance table for performing the measuring process by using the time span in units of single days corresponding to the days of the week.

As illustrated in FIG. 16A, the VM usage performance table 11 stores therein 0 to 2, 2 to 4, . . . , and 22 to 24 representing time periods that are kept in correspondence with the VM names. Under the heading of 0 to 2, a memory use frequency value measured for each of the VMs 92 during the time period from 0:00 to 2:00 hours is indicated. Similarly to the heading of "0 to 2", under the headings of 2 to 4, . . . , and 22 to 24, memory use frequency values measured for each of the VMs 92 during the corresponding time periods are indicated. In one example, for the VM name being "VM 1", the VM usage performance table 11 stores therein "200" for 0 to 2, "300" for 2 to 4, . . . , and "400" for 22 to 24. Further, for the VM name being "VM 2", the VM usage performance table 11 stores therein "1200" for 0 to 2, "1200" for 2 to 4, . . . , and "0" for 22 to 24.

As illustrated in FIG. 16B, the VM usage performance table 11 stores therein Sun, Mon, Tue, Wed, Thu, Fri, and Sat representing the days of the week, that are kept in correspondence with the VM names. Under the heading of Sun, a memory use frequency value measured for each of the VMs 92 during the one-day period on Sunday is indicated. Similarly to the heading of Sun, under the headings of Mon, Tue, Wed, Thus, Fri, and Sat, memory use frequency values measured for each of the VMs 92 during the corresponding one-day periods on the days of the week are indicated. In one example, for the VM name being "VM 1", the VM usage performance table 11 stores therein "200" for Sun, "1100" for Mon, . . . , and "400" for Sat. For the VM name being "VM 2", the VM usage performance table 11 stores therein "400" for Sun, "300" for Mon, . . . , and "400" for Sat.

By using the measured results stored in the two types of VM usage performance tables 11 described above, the controlling unit 20 selects one of the time spans that can be used as the trend periods. For example, when the time span that can be used as the trend periods is two hours, the controlling unit 20 calculates, for each of the VMs, an average value, per two hours, of the memory use frequency values measured in units of two hours. In the present example, for VMs 1 and 2, the average values of the memory use frequency values are calculated as indicated below in Expressions (1) and (2), respectively:

$$(200+300+200+400+1200+1000+1500+900+1100+800+600+400)/12=720 \quad (1)$$

$$(1200+1200+1200+1200+0+0+0+0+0+0+0+0)/12=400 \quad (2)$$

Further, when the time span that can be used as the trend periods is in units of single days represented by the days of the week, the controlling unit 20 calculates, for each of the VMs, an average value of the memory use frequency values per day. In the present example, for VMs 1 and 2, the average values of the memory use frequency values per day are calculated as indicated below in Expressions (3) and (4), respectively:

$$(200+1100+900+700+800+1000+400)/7=710 \quad (3)$$

$$(400+300+400+300+500+500+400)/7=400 \quad (4)$$

Further, when the time span that can be used as the trend periods is in units of two hours, the controlling unit 20 calculates, for each of the VMs, the difference between the average value and the smallest value of the memory use frequency values. In the present example, for VMs 1 and 2, the differences between the average and the smallest value of the memory use frequency values are calculated as indicated below in Expressions (5) and (6), respectively:

$$720-200=520 \quad (5)$$

$$400-0=400 \quad (6)$$

Further, when the time span that can be used as the trend periods is in units of single days represented by the days of the week, the controlling unit 20 calculates, for each of the VMs, the difference between the average value and the smallest value of the memory use frequency values. In the present example, for VMs 1 and 2, the differences between the average and the smallest value of the memory use frequency values are calculated as indicated below in Expressions (7) and (8), respectively:

$$710-200=510 \quad (7)$$

$$400-300=100 \quad (8)$$

Further, the controlling unit 20 calculates an average of the differences between the average value and the smallest value of the memory use frequency values, for each of the time spans that can be used as the trend periods. In the present example, when the time span that can be used as the trend periods is two hours, the average value is calculated as indicated below in Expression (9):

$$(520+400)/2=460 \quad (9)$$

Further, when the time span that can be used as the trend periods is single days represented by the days of the week, the average value is calculated as indicated below in Expression (10):

$$(510+100)/2=305 \quad (10)$$

After that, the controlling unit 20 selects the time span having the larger average of the differences between the average value and the smallest value of the memory use frequency values, as the time span that can be used as the trend periods and is to be used when the patch scheduling process is performed. The reason is that, if the average of the differences between the average value and the smallest value of the memory use frequency values is larger, it is supposed to be possible to select the time period having the smaller memory use frequency value as the trend period. In the present example, because the value calculated from Expression (9) is larger than the value calculated from Expression (10), the controlling unit 20 selects two hours as the time span that can be used as the trend periods.

The tasks performed by each of the VMs 92 may occasionally be changed. Thus, it is desirable that the controlling unit 20 perform, as appropriate, the process of selecting a time span that can be used as the trend periods.

Advantageous Effects of the Second Embodiment

According to the second embodiment described above, the management server 1 measures the memory use frequency value of each of the VMs 92 by using the plurality of time spans for each of the VMs 92 and records each of the results measured by using the plurality of time spans into the VM usage performance tables 11. After that, based on the information recorded by using the plurality of time spans, the management server 1 dynamically determines the time span that can be used as the trend periods. With this arrangement, because the management server 1 dynamically determines the time span that can be used as the trend periods, it is possible to select the time period having the smaller memory use frequency value as the trend period.

A Program and the Like

The first and the second embodiments are explained on the assumption that one VMM 91 is installed in each of the physical servers 2. However, possible embodiments are not limited to this example. A plurality of VMMs 91 may be installed in each of the physical servers 2.

Further, the management server 1 may be realized by installing the functions of the controlling unit 20, the storage unit 10, and the like described above, into a known information processing apparatus such as a personal computer, a workstation, or the like.

Further, it is not necessary to physically configure the constituent elements of the apparatuses and the devices illustrated in the drawings as indicated in the drawings. In other words, the specific mode of distribution and integration of the apparatuses and the devices is not limited to the ones illustrated in the drawings. It is acceptable to functionally or physically distribute or integrate all or a part of the apparatuses and the devices in any arbitrary units, depending on various loads and the status of use. For example, the VM move planning unit 23 and the VM move executing unit 24 may be integrated together as one unit. Further, the patch application executing unit 26 may be distributed into a moving unit that moves the VMs 92 grouped with the VMM 91 to which a patch is to be applied and a patch applying unit that applies the patch to the VMM 91 after the move. Further, the storage unit 10 storing therein the VM usage performance table 11 and the like may be connected via a network, as an external apparatus of the management server 1.

Figure 17:
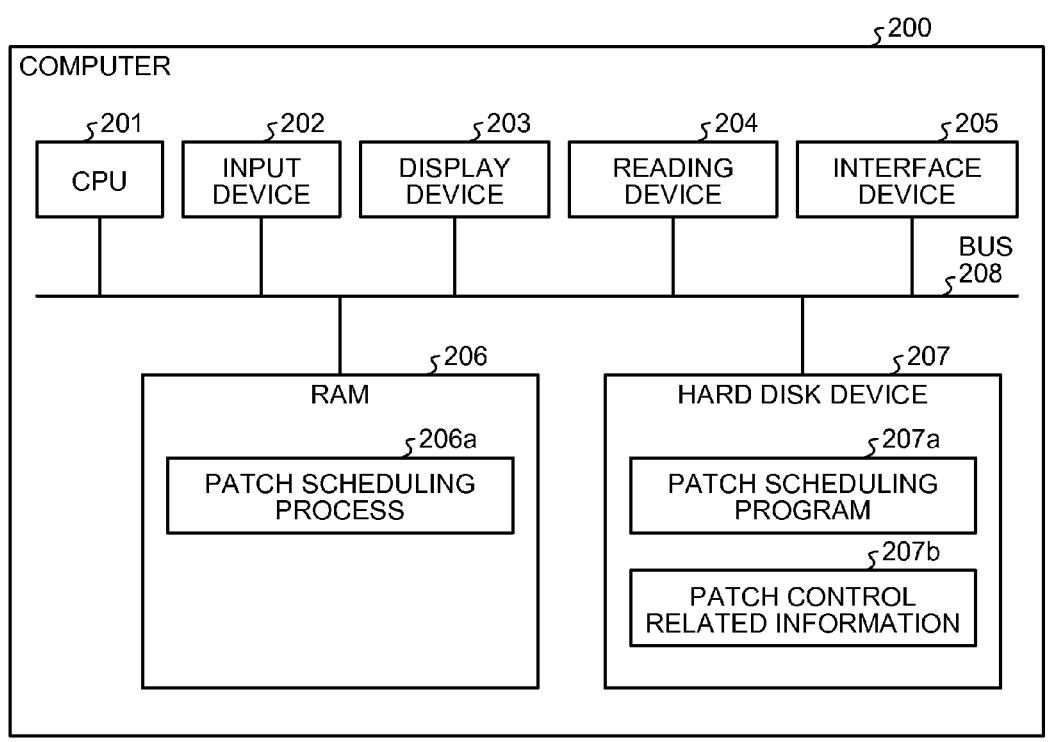
FIG. 17 is a diagram of an example of a computer that executes a patch scheduling program.
Figure 18:
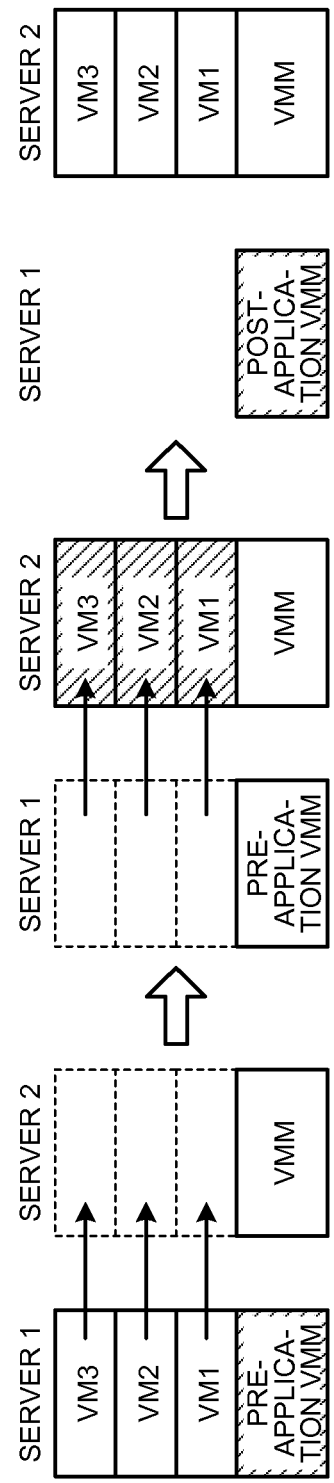
FIG. 18 is a drawing for explaining a related VMM patch application.

Further, the various types of processes explained above in the exemplary embodiments may be realized by causing a computer such as a personal computer or a workstation to execute a program prepared in advance. Next, an example of a computer that executes a patch scheduling program realizing the same functions as those of the management server 1 illustrated in FIG. 1 will be explained below. FIG. 17 is a diagram of an example of the computer that executes the patch scheduling program.

As illustrated in FIG. 17, a computer 200 includes: a Central Processing Unit (CPU) 201 that performs various types of computation processes; an input device 202 that receives an input of data from a user; and a display device 203. Also, the computer 200 further includes a reading device 204 that reads a program and the like from a storage medium; and an interface device 205 that gives and receives data to and from another computer via a network 5. In addition, the computer 200 also includes a Random Access Memory (RAM) 206 that temporarily stores various types of information therein; and a hard disk device 207. Further, the devices 201 to 207 are connected to a bus 208.

The hard disk device 207 stores therein a patch scheduling program 207a and patch control related information 207b. The CPU 201 reads the patch scheduling program 207a and loads the read program into the RAM 206. The patch scheduling program 207a functions as a patch scheduling process 206a.

For example, the patch scheduling process 206a corresponds to the VM usage performance measuring unit 21, the trend analyzing unit 22, the VM move planning unit 23, the VM move executing unit 24, the patch application planning unit 25, and the patch application executing unit 26. The patch control related information 207b corresponds to the VM usage performance table 11, the VM trend table 12, the VM configuration information table 13, the VMM patch management table 14, and the VM move history table 15.

In this situation, the patch scheduling program 207a does not necessarily have to be stored in the hard disk device 207 from the beginning. For example, the patch scheduling program 207a may be stored in a "portable physical medium" such as a flexible disk (FD), a Compact Disk Read-Only Memory (CD-ROM), a Digital Versatile Disk (DVD), a magneto-optical disk, an Integrated Circuit (IC) card, or the like that can be inserted in the computer 200. Further, it is acceptable to configure the computer 200 to read and execute the patch scheduling program 207a from any of these media.

According to at least one aspect of the computer program disclosed in the present disclosure, when the administrator applies the patch to the virtual software, the management server is able to migrate the virtual machines grouped with the virtual software to the moving destination at a high speed.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a patch scheduling program that causes a computer to execute a process comprising:
    managing a system including a plurality of software that control a plurality of virtual machines;
    aggregating virtual machines including a similar trend regarding a predetermined index thereof with a mutually-same virtual software;
    determining a time period during which the virtual machines are to be moved, based on the trends of the virtual machines aggregated with the mutually-same virtual software and based on moving time of the move of the virtual machines to a different virtual software included in the plurality of virtual software; and
    scheduling applying a patch to each of the plurality of virtual software at the determined time periods.

2. The non-transitory computer-readable recording medium according to claim 1, wherein
    the predetermined index is a memory use frequency value indicating frequency of use of a memory, and the memory use frequency value of each of the virtual machines is measured at a predetermined time interval for each of the virtual machines,
    the patch scheduling process further includes recording a measured result into a storage, and
    the aggregating includes: selecting, for each of the virtual software, a time period including a smaller memory use frequency value recorded in the storage than other time periods; calculating a dispersion value of the memory use frequency values with respect to the selected time period; and moving the virtual machines grouped with the virtual software including a largest calculated dispersion value to the different virtual software.

3. The non-transitory computer-readable recording medium according to claim 2, wherein the aggregating includes: moving such a virtual machine that is grouped with the virtual software including the largest calculated dispersion value and that corresponds to a time period including a dissimilar trend regarding the memory use frequency values, to the different virtual software.

4. The non-transitory computer-readable recording medium according to claim 3, wherein the aggregating further includes: selecting such virtual software that will include a smallest dispersion value when serving as moving destination virtual software in an event that a move-target virtual machine is moved thereto; and moving the move-target virtual machine to the selected virtual software.

5. The non-transitory computer-readable recording medium according to claim 2, wherein the aggregating is repeatedly performed.

6. The non-transitory computer-readable recording medium according to claim 2, wherein the recording includes: measuring the memory use frequency value of each of the virtual machines at time intervals derived by dividing each day into a plurality of sections, for each of the virtual machines; and recording the measured result into the storage.

7. The non-transitory computer-readable recording medium according to claim 2, wherein
    the recording includes: measuring the memory use frequency value of each of the virtual machines by using a plurality of predetermined time intervals, for each of the virtual machines; and recording measured results obtained by using the plurality of predetermined time intervals into the storage, and the predetermined time interval is dynamically determined based on information recorded by using the plurality of predetermined time intervals.

8. The non-transitory computer-readable recording medium according to claim 2, wherein
the storage records therein a move-target virtual machine that has been moved as a result of the moving, the virtual software at an origin of the moving, and the virtual software serving as the moving destination, and
information about the move-target virtual machine that is recorded as a result of the recording is output when an output request is made by an external entity.

9. A management server comprising:
a memory; and
a processor coupled to the memory, wherein the processor executes a process including:
managing a system including a plurality of software that control a plurality of virtual machines;
aggregating virtual machines including a similar trend regarding a predetermined index thereof with a mutually-same virtual software;
determining a time period during which the virtual machines are to be moved, based on the trends of the virtual machines aggregated with the mutually-same virtual software and based on moving time of the move of the virtual machines to a different virtual software included in the plurality of virtual software; and
scheduling applying a patch to each of the plurality of virtual software at the determined time periods.

10. A patch scheduling method comprising:
managing a system including a plurality of software that control a plurality of virtual machines, using a processor;
aggregating virtual machines including a similar trend regarding a predetermined index thereof with a mutually-same virtual software, using the processor;
determining a time period during which the virtual machines are to be moved, based on the trends of the virtual machines aggregated with the mutually-same virtual software and based on moving time of the move of the virtual machines to a different virtual software included in the plurality of virtual software; and
scheduling applying a patch to each of the plurality of virtual software at the determined time periods, using the processor.

* * * * *